United States Patent
Sheaffer

(10) Patent No.: US 6,351,802 B1
(45) Date of Patent: Feb. 26, 2002

(54) METHOD AND APPARATUS FOR CONSTRUCTING A PRE-SCHEDULED INSTRUCTION CACHE

(75) Inventor: Gad S. Sheaffer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/454,266

(22) Filed: Dec. 3, 1999

(51) Int. Cl.[7] .................................................. G06F 9/38
(52) U.S. Cl. ........................ 712/215; 712/216; 712/213; 712/207; 711/125; 711/129
(58) Field of Search .................................. 712/207, 213, 712/215, 216; 711/125, 129

(56) References Cited

U.S. PATENT DOCUMENTS

| | | | | |
|---|---|---|---|---|
| 5,127,093 A | * | 6/1992 | Moore, Jr. ................... | 712/217 |
| 5,295,249 A | * | 3/1994 | Blaner et al. ................ | 712/213 |
| 5,442,760 A | * | 8/1995 | Einar et al. .................. | 712/215 |
| 5,669,011 A | * | 9/1997 | Alpert et al. .................. | 712/23 |
| 5,742,784 A | * | 4/1998 | Potter et al. ................. | 712/213 |
| 5,794,003 A | * | 8/1998 | Sachs .......................... | 712/215 |
| 5,913,049 A | * | 6/1999 | Shiell et al. ................. | 712/215 |
| 5,923,862 A | | 7/1999 | Nguyen et al. | |
| 5,933,850 A | | 8/1999 | Kumar et al. | |
| 6,212,623 B1 | * | 4/2001 | Witt ............................ | 712/216 |
| 6,253,313 B1 | * | 6/2001 | Morrison et al. ........... | 712/226 |

FOREIGN PATENT DOCUMENTS

| EP | 0605927 | | 7/1994 |
|---|---|---|---|
| EP | 1050808 | A1 | 11/2000 |

OTHER PUBLICATIONS

Minagawa et al., "Pre-decoding Mechanism for Supersealar Architecture", IEEE Pacific Rom, May 9–10, 1991.*
Conference on Communications, Computers, and Signal Processing, vol. 1, pp. 21–24.*
International Search report for PCT/NO90/00143, Dated Apr. 4, 1991.
International Search report for PCT/US96/08255, Dated Dec. 5, 1996.

* cited by examiner

Primary Examiner—William M. Treat
(74) Attorney, Agent, or Firm—Blakely, Sokoloff, Taylor & Zafman LLP

(57) ABSTRACT

A method of scheduling instructions in a computer processor. The method comprises fetching instructions to create an in-order instruction buffer, and scheduling instruction from the instruction buffer into instruction slots within instruction vectors in an instruction vector table. Instruction vectors are then dispatched from the instruction vector table to a pre-scheduled instruction cache, and, in parallel, to an instruction issue unit.

26 Claims, 6 Drawing Sheets

| EU1 | EU2 | EU3 | EU4 | EU5 | WAIT | PC INCREMENT |
|---|---|---|---|---|---|---|
| | | | | | | |
| | | | | | | |
| | | | | | | |
| | | | | | | |
| | | | | | | |
| | | | | | | |
| | | | | | | |

*FIG. 4A*

| INSTRUCTION | SOURCE 1 OPERAND | SOURCE 2 OPERAND | DESTINATION | RELATIVE PC |
|---|---|---|---|---|

*FIG. 4B*

| EU1 FLAG | EU1 OPERATION (IF EU1 FLAG SET) | EU2 FLAG | EU2 OPERATION (IF EU2 FLAG SET) | EU3 FLAG | EU3 OPERATION (IF EU3 FLAG SET) | EU4 FLAG | EU4 OPERATION (IF EU4 FLAG SET) | EU5 FLAG | EU5 OPERATION (IF EU5 FLAG SET) |
|---|---|---|---|---|---|---|---|---|---|
| 1 | EU1 OPERATION | 0 | | 1 | EU3 OPERATION | 0 | | | |
| 0 | | 1 | EU2 OPERATION | 1 | EU3 OPERATION | 1 | EU4 OPERATION | 0 | |

*FIG. 5*

| INSTRUCTION 1 | RELATIVE SCHEDULING TIME STAMP | INSTRUCTION 2 | RELATIVE SCHEDULING TIME STAMP | INSTRUCTION 3 | RELATIVE SCHEDULING TIME STAMP | ... | EXTRA SPACE |
|---|---|---|---|---|---|---|---|
| INSTRUCTION 1 | RELATIVE SCHEDULING TIME STAMP | INSTRUCTION 2 | RELATIVE SCHEDULING TIME STAMP | INSTRUCTION 3 | RELATIVE SCHEDULING TIME STAMP | ... | EXTRA SPACE |

*FIG. 6*

METHOD AND APPARATUS FOR CONSTRUCTING A PRE-SCHEDULED INSTRUCTION CACHE

FIELD OF THE INVENTION

The present invention relates to the field of computer processor architecture. In particular the present invention discloses a method and apparatus for scheduling computer instructions.

BACKGROUND OF THE INVENTION

Early computer processors executed computer instructions one at a time in the original program order. Specifically, each computer instruction is loaded into the processor and then executed. After execution, the results of the computer instruction are then written into a register or into main memory. After the execution of a computer instruction, the next sequential computer instruction is then loaded into the processor and executed.

To improve performance, pipelined computer processors were introduced. Pipelined computer processors process multiple computer instructions simultaneously. However, early pipelined computer processors execute the instructions in the original program order. Pipelined processors operate by dividing the processing of instructions into a series of pipeline stages such as instruction fetch, instruction decode, execution, and result write-back. The processor is then divided into a set of linked pipeline stages that each perform one of the instruction processing pipeline stages. In the previously described example, the processor would be divided into an instruction fetch stage, an instruction decode stage, an execution stage, and write-back stage. During each clock cycle, each processing stage processes an instruction and then passes it to the next sequential processing stage. Thus, the processor is processing several instructions simultaneously in the original program order. In an ideal single pipeline processor, the processor will complete the execution of an instruction during every clock cycle.

To further improve processor performance, superscalar processors have been introduced. Superscalar processors process more than one instruction at a time using parallel pipeline stages. By executing instructions in parallel, superscalar processors take advantage of the parallelism that exists in the instructions. Parallelism exists when sequential computer instructions are not dependent upon each other for source operands. These non dependent sequential instructions can be executed in parallel without any data conflicts.

One of the difficult aspects of designing superscalar processors is to find and schedule instructions in parallel such that there are no data dependency violations and sufficient processor resources are available.

SUMMARY OF THE INVENTION

According to one embodiment, a method of scheduling instructions in a computer processor is provided. The method comprises fetching instructions to create an in-order instruction buffer, and scheduling instructions from the in-order instruction buffer into instruction slots within instruction vectors in an instruction vector table. Instruction vectors are then dispatched from the instruction vector table to a prescheduled instruction cache, and, in parallel, to an instruction issue unit.

BRIEF DESCRIPTION OF THE DRAWINGS

FIG. 4A illustrates one embodiment of a scheduled instruction vector table.

FIG. 4B illustrates one embodiment of the contents of each instruction slot in from the instruction vector table of FIG. 4A.

FIG. 5 illustrates an alternate embodiment of a prescheduled instruction vector table.

FIG. 6 illustrates a cache memory that stores instructions along with an accompanying relative scheduling timestamp.

DETAILED DESCRIPTION OF THE PREFERRED EMBODIMENT

A method and apparatus for providing a prescheduled instruction cache in a computer processor is disclosed. In the following description, for purposes of explanation, specific nomenclature is set forth to provide a thorough understanding of the present invention. However, it will be apparent to one skilled in the art that these specific details are not required in order to practice the present invention.

Figure 1:
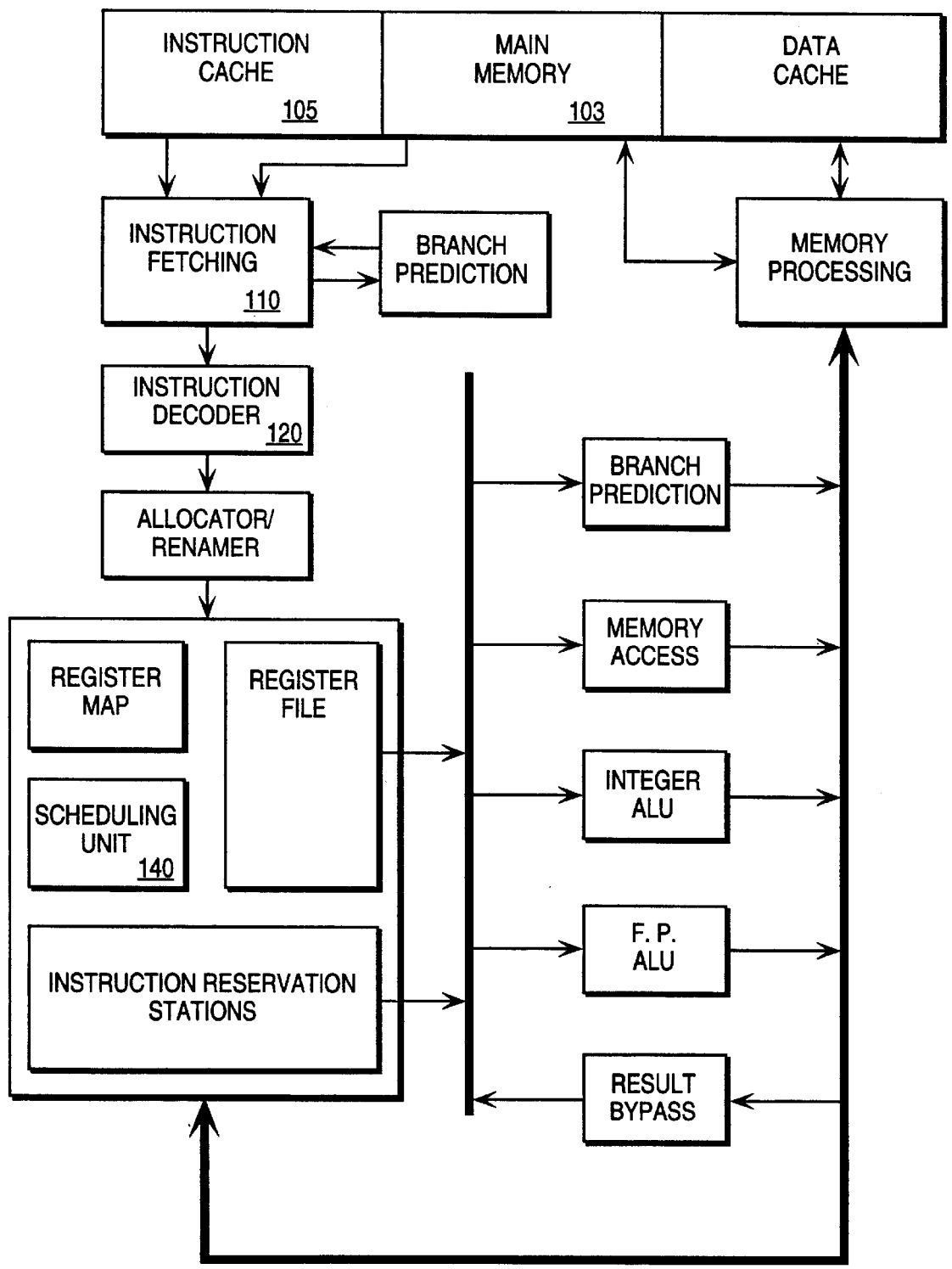
FIG. 1 illustrates a prior art out-of-order computer processor.

FIG. 1 illustrates a prior art out-of-order superscalar computer processor. In the computer processor of FIG. 1, an instruction fetch unit 110 fetches instructions from a first level local instruction cache 105 or a main memory unit 103. If the desired instruction is in the first level local instruction cache 105, then the instruction fetch unit 110 fetches from that first level local instruction cache 105. Otherwise, the instruction fetch unit 110 fetches the desired instruction from the main memory unit 103. In some embodiments, a second level cache may be present as an alternative to the main memory.

The fetched instructions are passed to a decoder 120 that decodes the fetched instructions. The decoded instructions are then passed to an allocator/renamer that allocates entries for instructions in a reservation station and performs register renaming using a register file and register map.

A scheduling unit 140 then schedules the instructions for execution. The scheduling unit 140 selects the instructions that will be executed at any given cycle of the processor. The scheduled instructions are dispatched from the reservation stations along with operands from the register file to execution units for execution.

During each clock cycle, the scheduling unit 140 selects a set of instructions to dispatch to the execution units. The source operands for the selected instructions are available (in the register file) or will be available (a result from an execution unit) at dispatch time. Furthermore, execution resources should be available for the selected instructions. In most processors, the individual execution units are not identical such that each execution unit can only process certain types of instructions. Thus, the scheduling unit 140 determines whether the type of execution unit required will be available. Finally, in one embodiment the scheduling unit 140 selects the instructions that will cause the program to execute faster. As such, in one embodiment, this is accomplished by selecting the oldest available instructions first. Thus, the scheduling unit 140 attempts to service instructions in a First-In First-Out (FIFO) manner.

Due to these difficult constraints and the typically short time period in which a scheduling unit 140 must make a decision, most schedulers are unable to schedule instructions in the optimal manner. Thus, although there is more fine-grain parallelism available in the computer object code, scheduling units typically only take advantage of a limited amount of the parallelism.

A Pre-Scheduled Instruction Cache Processor Architecture

In one embodiment, an instruction cache has been placed after an instruction scheduler in the instruction processing pipeline. By placing the instruction cache after the instruction scheduler the instruction scheduler can create "pre-scheduled" vectors of instructions and store the pre-scheduled instruction vectors in the instruction cache. An instruction issue unit can then feed the execution units with pre-scheduled instruction vectors from the instruction scheduler or from the prescheduled instruction cache.

Figure 2:
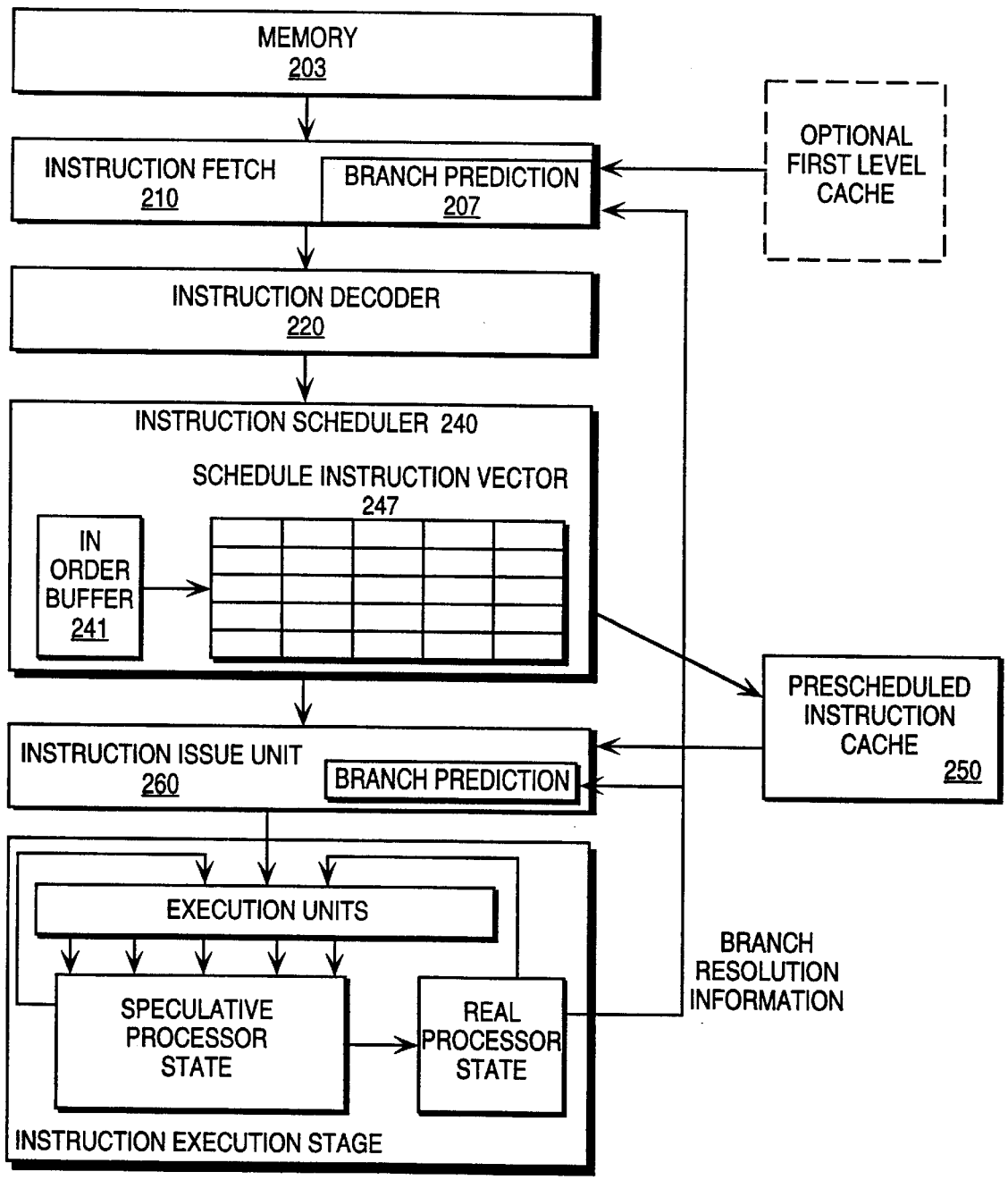
FIG. 2 illustrates a block diagram of the processor architecture with a prescheduled instruction cache according to one embodiment.

FIG. 2 illustrates a block diagram of the processor architecture according to one embodiment. At the top of FIG. 2 is the memory 203 where instructions are initially fetched from. The memory 203 may consist of standard main memory or the memory 203 may consist of main memory and an integrated instruction cache. An instruction fetch unit 210 fetches the instructions to be executed from the memory 203. To determine the instruction execution path in one embodiment, the instruction fetch unit 210 incorporates a branch prediction unit 207. The branch prediction unit 207 predicts an execution path of the program and fetches instructions along that predicted execution path. Thus, the instruction fetch unit 210 fetches a continuous stream of in-order instructions, according to the predicted execution path.

The instruction fetch unit 210 passes the fetched instructions to an instruction decoder 220. The instruction decoder 220 isolates in the processor instructions and determines the necessary resources. In one embodiment, the instruction decoder 220 translates the processor instructions into small micro-operation codes (micro-ops). The micro-ops are then processed by the remainder of the processor pipeline.

The instruction decoder 220 passes the decoded instructions onto the instruction scheduler 240. The instruction scheduler 240 places the decoded instructions into a buffer 241 in the original program order. The instruction scheduler then selects instructions from the in-order buffer 241 to place in one of a number of instruction vectors in a scheduled instruction vector table 247. Thus, the in-order buffer 241 provides a set of candidate instructions to schedule. The scheduled instruction vector table 247 consists of a number of instruction slots that are each associated with a matching execution unit. Since the execution units are not all the same, the scheduler schedules instructions for the respective execution slot that corresponds to an operation of the respective instruction.

When the scheduler 240 can no longer find an open instruction slot in the scheduled instruction vector table 247, then the scheduler 240 dispatches the oldest execution vector (e.g., the instruction vector that least recently received an instruction). In one embodiment, the scheduler 240 sends the oldest execution vector to prescheduled instruction cache 250 and to an instruction issue unit 260, in parallel.

In one embodiment, the instruction issue unit 260 issues instructions to a set of execution units. Since the instructions have been prescheduled, instruction issue unit 260 can simply send a prescheduled instruction vector to the execution units. To increase the speed of execution, the instruction issue unit 260 can issue prescheduled instruction vectors received linearly from the scheduler 240 or the instruction issue unit 260 can issue prescheduled instruction vectors obtained from the prescheduled instruction cache 250.

In one embodiment, the execution units execute instructions and store the state in a speculative state buffer. The speculative state is transferred into a real processor state buffer as the branch predictions are verified. When a branch is mispredicted, the speculative state generated after the misprediction is thrown away. In an alternate embodiment, the speculative state the real processor state may occupy the same buffer and a real state pointer map can be used to indicate the current real state.

Figure 3:
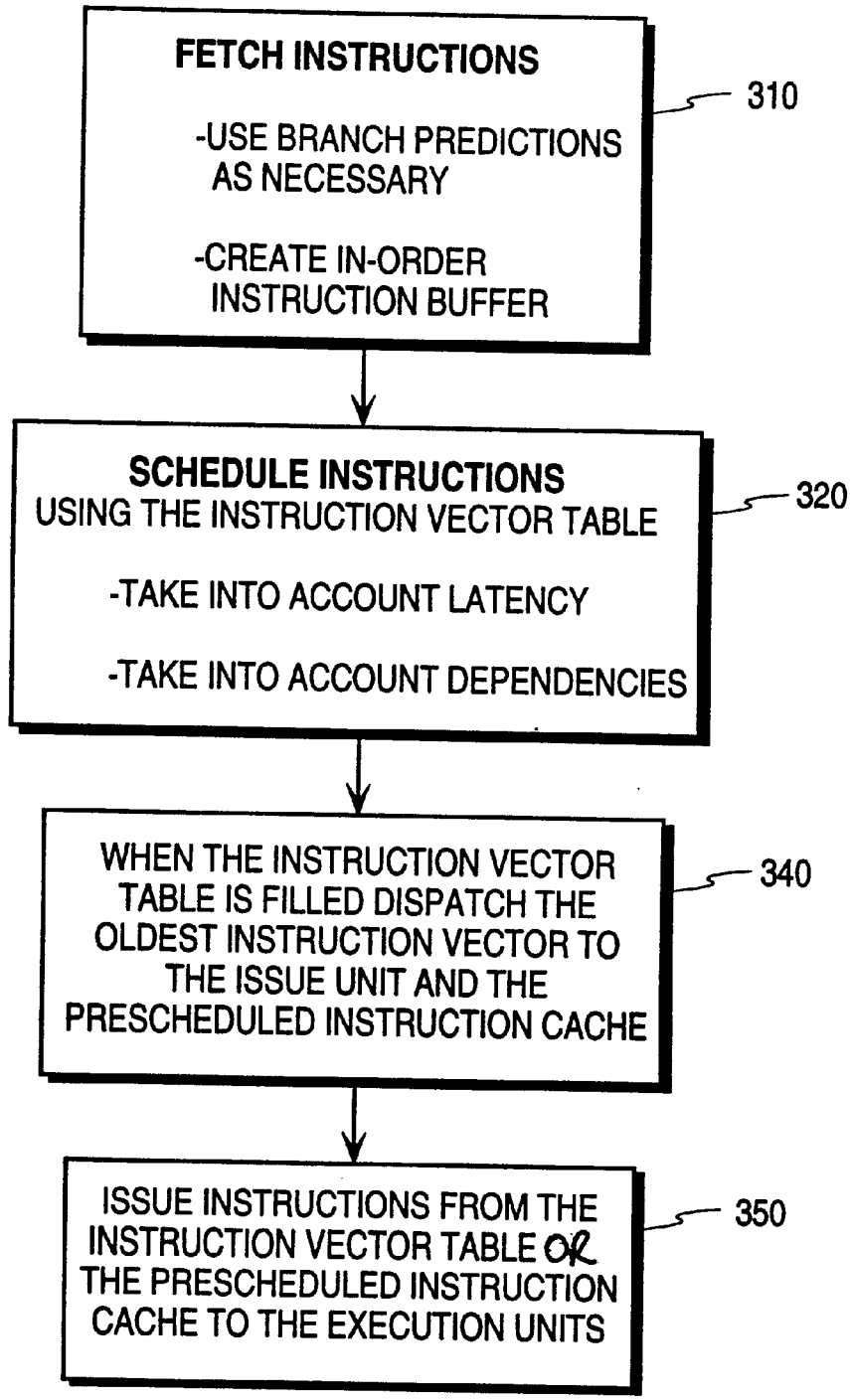
FIG. 3 illustrates a flow diagram describing the processing performed by a processor having a prescheduled instruction cache according to one embodiment.

FIG. 3 illustrates a flow diagram of the instruction processing performed by a processor constructed according one embodiment. Initially, an instruction fetch unit fetches a stream of instructions at step 310. To fetch a continuous stream of instructions, the instruction fetch unit performs branch prediction. The output of the instruction fetch unit is placed into a buffer of in-order instructions in the instruction scheduler. This buffer may also be known as the instruction buffer, or the in-order instruction buffer.

Next, at step 320, an instruction scheduler schedules the in-order instructions from the instruction buffer into instruction slots in the instruction vector table. The instruction scheduler schedules groups of instructions taking into account the data dependencies, the available execution resources, and/or the execution latency.

Since the instruction scheduler can select from a instruction buffer, the instruction scheduler can extract parallelism from the instruction code. Furthermore, since an instruction cache resides after the instruction scheduler, the instruction cache can supply instructions to the execution units thereby providing additional bandwidth to the complex task of instruction scheduling.

When, as stated in step 340, the scheduler attempts to schedule an instruction and determines that it cannot place the instruction into an available instruction slot in the instruction vector table, the scheduler then passes the oldest instruction vector to an instruction issue unit and a prescheduled instruction cache. As a result, a new empty instruction vector is available to be used. In one embodiment, the instruction scheduler attempts to place instructions into the oldest instruction vectors thereby minimizing latency.

Referring to step 350, the instruction issue unit selects instruction vectors to issue to the execution units. During sections of code without branches, the instruction issue unit may issue consecutive instruction vectors received from the instruction scheduler. However, when a loop occurs in the program code, for example, the instruction issue unit can select prescheduled instruction vectors from the prescheduled instruction cache. Since the instruction issue unit will often issue instructions from the prescheduled instruction cache, the instruction scheduler does not need to generate instruction vectors at the full execution speed of the execution units.

The scheduled instruction vector table 247 of FIG. 2 may be implemented in a number of different manners. Two different possible embodiments are described.

FIG. 4A illustrates a first method of implementing a scheduled instruction vector table. In the embodiment of FIG. 4A, each instruction vector (row) of the scheduled instruction vector table consists of fixed instruction slot for each execution unit. In the embodiment of FIG. 4A, there are five execution units such that there are five instruction slots: EU1, EU2, EU3, EU4, and EU5. In alternative embodiments, the number of instruction slots in an instruction vector can vary without departing from the scope of the invention.

The instruction scheduler attempts to schedule an instruction into all the instruction slots, but data dependencies and execution latency may prevent such optimal scheduling. When the scheduler can not find an instruction to place into an instruction slot of an instruction vector, that instruction slot is filled with a "no operation" code before the instruction vector is dispatched. Alternatively, when a line is vacated, all slots in the line are initialized with NOPs.

FIG. 4B illustrates one possible embodiment of the contents of each instruction slot in the instruction vector table of FIG. 4A. Referring to FIG. 4B, each instruction slot contains an instruction code, a first source operand, a second source operand, a result destination, and a relative program counter (PC) value. The instruction code defines the operation to be performed and the source operands are the data that the operation is performed upon. The result destination(s) specify register(s) or flag(s) affected by the operation. In one embodiment, the relative program counter (PC) designates a position of the instruction relative to a program counter value for the instruction vector. The relative program counter (PC) may be used for determine when speculative results can be committed.

Referring back to FIG. 4A, in an alternative embodiment, each instruction vector may include two fields in addition to the instruction slots: a wait value and/or a program counter (PC) increment value. The wait value is used to determine how long the instruction issue unit should delay before issuing the next instruction vector. Considering execution latency and data dependencies, the instruction issue unit will sometimes need to wait one or more cycles before issuing the next instruction vector. As a result of using the wait value in one embodiment, a need to store an instruction vector with empty slots to provide a delay, is reduced.

In one embodiment, the program counter (PC) increment value may be used to determine how much to increment a program counter value after the instruction vector has been executed. Since in one embodiment, the processor architecture executes instructions out of the original program order and multiple instructions may be executed during each cycle, there is not a strict linear program counter value. However, a program counter value can be used to determine an approximate location of current program execution.

Consider the example of an instruction vector containing instructions 5, 6, 7, 19, and 23 (from the original program order). Further consider, all the instructions up to 7 have been scheduled. After the vector has been successfully executed, the respective instruction pointer can be advanced to 7. As a result, if an exception occurs during the execution of instruction in the instruction vector, the program counter value can be used to determine where to resume executing instructions following completion of an exception handler.

FIG. 5 illustrates an additional alternative embodiment of a prescheduled instruction vector table. In the prescheduled instruction vector table of FIG. 5, there are no fixed instruction slots. Instead, the embodiment of FIG. 5 uses a flag to determine if there is an instruction included in the respective instruction vector for each execution unit. If the flag for an execution unit is set to zero, then there is no instruction for that particular execution unit. If the flag for an execution unit is set to one, then the next bits specify an instruction for that particular execution unit.

For example, referring to the second row of FIG. 5, the execution unit flag for execution unit one is set to one such that an instruction for execution unit one immediately follows the first executing unit flag. After the instruction for execution unit one, there is a flag for execution unit two. In this example, the flag for execution unit two is set to zero such that there is no instruction for execution unit two. The next bit is an execution flag for execution unit three.

Since the execution flag for execution unit three is set to one, an instruction for execution unit three immediately follows the execution flag for execution unit three. By using flags to determine if an instruction exists for a particular execution unit, the size of the instruction vector table/cache may be reduced. In alternative embodiments, a flag may be zero to indicate an operation is present for a corresponding execution unit, without departing from the scope of the invention.

In addition, instead of fully prescheduling instructions, an alternate embodiment a partial prescheduling of instructions. Specifically, an instruction scheduling unit is placed before an instruction cache and the instruction scheduling unit makes scheduling suggestions. The instructions along with the scheduling suggestions are then stored in the instruction cache. The scheduling suggestions can be created in the form of relative associated with each instruction.

FIG. 6 illustrates a cache memory built according to the teachings of the alternate embodiment. In the cache memory of FIG. 6 each instruction is stored along with an accompanying relative scheduling time-stamp that could be used by a second scheduler near the execution units for final scheduling. In one embodiment, the relative scheduling time-stamp could be computed based upon such factors as probability of correct branch prediction or probability for cache hit/miss. Alternatively, the second scheduler may schedule instructions in a different manner depending branch mispredictions and unexpected latencies.

The foregoing has described a method and apparatus for providing prescheduled instruction cache. It is contemplated that changes and modifications may be made by one of ordinary skill in the art, to the materials and arrangements of elements of the present invention without departing from the scope of the invention.

For example the methods as described above, including the alternative embodiments, could be implemented as instructions to be executed by a processor, represented on a machine-readable medium. The machine-readable medium can include a mechanism for storing or transmitting information in a form readable by a machine (e.g., computer). For example, a machine-readable medium includes read only memory (ROM); random access memory (RAM); magnetic disk storage media; optical storage media; flash memory devices; electrical, optical, acoustical or other form of propagated signas (e.g., carrier waves, infrared signals, digital signals, etc.)

We claim:

1. A method of scheduling instructions in a computer processor, said method comprising:

fetching instructions into an in-order instruction buffer;

scheduling instruction from said in-order instruction buffer into instruction slots within instruction vectors of an instruction vector table; and dispatching instruction vectors from said instruction vector table to a prescheduled instruction cache, and, in parallel, to an instruction issue unit.

2. The method of claim 1 further comprising:

executing, in parallel, instructions placed into a single instruction vector.

3. The method of claim 2 further comprising:

issuing an instruction vector from said instruction issue unit into a set of execution units.

4. The method of claim 1 wherein said dispatching instruction vectors from said instruction vector table includes dispatching an oldest instruction vector from said instruction vector table when an instruction in said in-order instruction buffer cannot be scheduled into an available instruction slot within said instruction vector table.

5. The method of claim 1 wherein said instruction vector table includes instruction vectors having fixed instruction slots.

6. The method of claim 1 wherein said instruction vectors of said instruction vector table include a wait value representing a delay to occur before issuing a subsequent instruction vector.

7. The method of claim 1 wherein said instruction vectors of said instruction vector table include a program counter increment value.

8. The method of claim 1 wherein each slot of an instruction vector in said instruction vector table includes a flag representing whether an operation for a respective execution unit is included in the respective instruction vector.

9. The method of claim 1 wherein each slot of an instruction vector in said instruction vector table includes a scheduling suggestion for subsequent scheduling.

10. A machine-readable medium representing instructions, which when executed by a processor, cause said processor to perform the following:

fetching instructions into an in-order instruction buffer;

scheduling instruction from said instruction buffer into instruction slots within instruction vectors of an instruction vector table; and dispatching instruction vectors from said instruction vector table to a prescheduled instruction cache, and, in parallel, to an instruction issue unit.

11. The machine-readable medium of claim 10 representing additional instructions, which when executed by a processor, cause said processor to perform the following:

executing in parallel instructions placed into a single instruction vector.

12. The machine-readable medium of claim 2 representing additional instructions, which when executed by a processor, cause said processor to perform the following:

issuing an instruction vector from said instruction issue unit into a set of execution units.

13. The machine-readable medium of claim 10 wherein said dispatching instruction vectors from said instruction vector table includes dispatching an oldest instruction vector from said instruction vector table when an instruction in said in-order instruction buffer cannot be scheduled into an available instruction slot within said instruction vector table.

14. The machine-readable medium of claim 10 wherein said instruction vector table includes instruction vectors having fixed instruction slots.

15. The machine-readable medium of claim 10 wherein said instruction vectors of said instruction vector table include a wait value representing a delay to occur before issuing a subsequent instruction vector.

16. The machine-readable medium of claim 10 wherein said instruction vectors of said instruction vector table include a program counter increment value.

17. The machine-readable medium of claim 10 wherein each slot of an instruction vector in said instruction vector table includes a flag representing whether an operation for a respective execution unit is included in the respective instruction vector.

18. The machine-readable medium of claim 10 wherein each slot of an instruction vector in said instruction vector table includes a scheduling suggestion for subsequent scheduling.

19. An apparatus to process computer instructions, said apparatus comprising:

an instruction fetch unit to fetch instructions and place said instructions into an in-order instruction buffer;

an instruction vector table comprising a plurality of instruction vectors, said instruction vectors having two or more slots for instructions to be executed in parallel; and a scheduler to schedule instructions from said in-order instruction buffer into said instruction vector table, said scheduler to dispatch instruction vectors from said instruction vector table to a prescheduled instruction cache, and, in parallel, to an instruction issue unit.

20. The apparatus of claim 19 further comprising:

an execution unit to execute, in parallel, all instructions placed into a single instruction vector.

21. The apparatus of claim 19 wherein said scheduler dispatches an oldest instruction vector from said instruction vector table when an instruction in said in-order instruction buffer cannot be scheduled into an available instruction slots within said instruction vector table.

22. The apparatus of claim 19 wherein said instruction vector table includes instruction vectors having fixed instruction slots.

23. The apparatus of claim 19 wherein said instruction vectors of said instruction vector table include a wait value representing a delay before issuing a subsequent instruction vector.

24. The apparatus of claim 19 wherein said instruction vectors of said instruction vector table include a program counter increment value.

25. The apparatus of claim 19 wherein each slot of an instruction vectors in said instruction vector table includes a flag representing whether an operation for respective execution unit is included in the respective instruction vector.

26. The apparatus of claim 19 wherein each slot of an instruction vectors in said instruction vector table includes a scheduling suggestion for subsequent scheduling.

* * * * *